United States Patent Office 2,741,876
Patented Apr. 17, 1956

2,741,876

SOIL CONDITIONER AND METHOD OF MAKING SAME

Carlo Paoloni, Turin, Italy, assignor to Rumianca S. p. A., Turin, Italy

No Drawing. Application March 20, 1953, Serial No. 343,781

Claims priority, application Italy September 9, 1952

1 Claim. (Cl. 47—58)

This invention relates to a soil conditioner for increasing the porosity of soils in which it is incorporated and is more particularly concerned with a soil conditioner of the character indicated which is effective in the treatment of acidic clay-containing soils.

The influence of the physical structure of the soil upon the growth of vegetation is well known. When soils are relatively dense and compact and of an acidic clay-containing structure, a hard, dense crust is formed in dry weather and the growth of young plants is seriously retarded and in most cases completely prevented. In wet weather, this crust forms an effective barrier to the penetration of moisture. As a result, soils of this character are generally shunned by farmers and no attempt is made to till them. In many parts of the world there are substantial areas covered by this type of soil which could be made to yield large quantities of important crops if the growth inhibiting and retarding physical structure of the soil could be changed to one in which vegetable growth could occur freely. As the population of the world increases, the problem of utilizing this non-arable land becomes more and more serious.

It is an object of the present invention to provide a soil conditioner which is particularly effective in transforming acidic clay-containing soils, which are normally wholly unsuitable for vegetable growth, into arable land.

It is a further object of the present invention to provide a soil conditioner of the character indicated which will normally compact, dense, acidic clay-containing soil into an arable soil having a brittle, permeable structure.

It is another object of the invention to provide a soil conditioner which is effective upon being commingled with the soil to be treated and makes possible the economical reclaiming of soils which have been heretofore wholly unsuited for the growth of crops.

It is another object of the invention to provide process for manufacturing the soil conditioner.

In accordance with the invention, there is provided a soil conditioner which comprises a granular conglomerate of an iron oxide, preferably ferric oxide, and ferric sulphate in anhydrous or hydrated form, the iron oxide being employed as anhydrous iron oxide or in its hydrated form, iron hydroxide. By the term "iron" I intend to include both the ferric and ferrous forms although I prefer to use compounds containing ferric iron. The conglomerate of iron oxide and ferric sulfate is readily mixed with argillaceous soils of all types and is particularly effective in its action on acidic argillaceous soils. It has been found that the presence of the iron oxide in combination with the ferric sulphate buffers the acidity of the soil to which the soil conditioner of this invention is added and the desired flocculation of the clay-containing soil is brought about.

The proportions of the constituents may vary over a relatively wide range and may contain 5 to 90% by weight iron oxide or hydroxide, i. e. ferric oxide, ferrous oxide, ferric hydroxide or ferrous hydroxide, an 10 to 95% by weight ferric sulphate, but preferably the product contains 15 to 50% by weight ferric oxide or hydroxide. While preferably the iron oxide and the ferric sulfate are, except for minor amounts of by-product compounds formed during the preparation of the conglomerates, the sole active constituents of the conglomerates, other soil-improving compounds may be admixed therewith. For example, a particularly suitable soil conditioner in accordance with the invention comprises ammonium sulphate in admixture with the ferric sulphate and the iron oxide or hydroxide.

Granular conglomerates of the character indicated may be prepared by several convenient procedures. For example, soil conditioners in accordance with the invention are readily prepared by treating pyrite ashes with sulphuric acid. Pyrite ashes are obtained by the roasting of iron pyrites in accordance with the following equation:

$$4FeS_2 + 11O_2 \rightarrow 2Fe_2O_3 + 8SO_2$$

a small amount of ferrous oxide (FeO) being formed with the $Fe_2O_3$. To prepare the soil conditioner, the thus-obtained pyrite ashes are treated with sulphuric acid of 60 to 94% concentration in an amount sufficient to form a ferric oxide-ferric sulphate conglomerate containing 10 to 50% by weight of ferric sulphate, preferably 30 to 40% by weight. Thus, as a general rule about ¾ to 5¼ parts of sulphuric acid (calculated as 100% $H_2SO_4$) are used per 10 parts by weight of pyrite ashes, preferably about 2 to 3 parts of $H_2SO_4$ per 10 parts of ashes. The sulphuric acid and the pyrite ashes, previously ground to a small particle size, e. g. 95% through a 200 to 270 mesh sieve, are added to a suitable reaction vessel and mixed to insure optimum contact. The reactants may be mixed at room temperature or at somewhat elevated temperatures, e. g. up to 80° C. The reaction is exothermic and the reaction mass rapidly rises in temperature. Additional heat is advantageously supplied until the temperature of the reaction mass reaches 125 to 150° C. and the mass is maintained at this temperature, to insure completion of the reaction, for about 1½ to 3 hours. The mass is then allowed to cool and the cooled conglomerate of ferric oxide and ferric sulphate is comminuted into easily-handled granules.

Alternatively, an iron oxide-ferric sulphate conglomerate is advantageously prepared by oxidizing ferrous sulphate with air in the presence of an oxidation catalyst, e. g. copper sulfate, to convert the ferrous sulphate to ferric sulphate and ferric oxide. Oxidation is carried out at a temperature of 170 to 300° C., preferably at about 225° to 275° C., and is continued until substantially all of the ferrous iron has been oxidized to the ferric state. The desired conglomerate, which is thus obtained, is then broken up into granules for easy handling and mixing with the soil.

The invention includes, in addition to conglomerates consisting of iron oxide or iron hydroxide mixed with ferric sulphate, compositions of a type which, when introduced into the soil, in the presence of moisture, generate a mixture of ferric hydroxide and ferric sulphate. This type includes the compounds known as ferric-amminsulphate, having the general formula 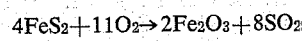 $(Fe_1(SO_4)_3 \cdot xNH_3)$ wherein $x = 12$, 6, 4, or 2, which form with water, more particularly in the soil, a mixture of ferric hydroxide, ferric sulphate, and ammonium sulphate.

This product is conveniently obtained by reacting gaseous ammonia with anhydrous technical ferric sulphate, preferably in the proportions of 5–15 parts ammonia to 100 parts ferric sulphate.

Granular conglomerates produced in accordance with the present invention are readily mixed with the soil and when so mixed they have a highly beneficial action, particularly on said clay-containing soil, and render the soil brittle and porous by flocculating the clayey portions of the soil. In this way acid argillaceous soils which are normally unsuited for cultivation may be converted into arable soils in which crops are easily grown. The amount of the granular conglomerates which may be added to the soil will vary somewhat depending upon variations in the nature of the soil, but as a general rule highly effective results are obtained by employing about ½ to 2 tons, preferably about 1 ton, per acre of soil treated. The soil conditioner is normally mixed with the soil to a depth of about six inches although lesser or greater depths may be employed.

The following specific examples are further illustrative of the invention:

Example 1

120 parts by weight of pyrite ash, previously pulverized (99% passing a 250 mesh sieve), are mixed and kneaded with 41 parts by weight of sulfuric acid (57.6° Bé.) at a temperature of about 70° C. The resulting exothermic reaction rapidly heats the reaction mass and additional heat is supplied to increase the temperature of the mass to 140° C. over a period of 2 hours. The mass is then allowed to cool and there is obtained a brownish-red conglomerate which is easily broken up into granules. Analysis of the granules shows them to contain 62% ferric oxide and 38% ferric sulfate.

Example 2

100 parts of ferrous sulfate containing 70% $FeSO_4$ and 30% $H_2O$ are heated to 250° C. in an air stream in the presence of copper sulfate as an oxidation catalyst. The reaction is continued for about 2 hours to insure completion of the oxidation. There is obtained a conglomerate containing 84% ferric sulfate and 16% ferric oxide, the conglomerate being readily subdivided into granules.

Example 3

100 parts of technical powdered ferric sulfate containing 90% $Fe_2(SO_4)_3$ are treated with 8 parts of gaseous ammonia while stirring continuously. The temperature of the mass rises during the reaction and the mass turns brown. There is obtained a conglomerate containing 7.4% ammonia and 83.3% ferric sulphate.

In the presence of moisture in the soil, the product decomposes yielding a mixture "of ferric hydroxide, ferric sulphate and ammonium sulphate."

The granular conglomerates produced in accordance with Examples 1, 2 and 3, when mixed with a clay-containing soil, particularly an acid clay-containing soil, transform such soil into a brittle and permeable mass and thereby greatly increase the arability of the soil.

It will be apparent that changes and modifications may be made without departing from the scope of the invention as defined in the appended claim and it is intended that all matter contained in the foregoing description shall be interpreted as illustrative only.

What I claim and desire to secure by Letters Patent is:

The method of rendering arable a normally non-arable acidic argillaceous soil which comprises mixing with said argillaceous soil a soil conditioner comprising a granular conglomerate consisting essentially of 5 to 90% by weight of a member of the group consisting of iron oxide and iron hydroxide and 10 to 95% by weight ferric sulphate, said soil conditioner being employed in the proportion of ½ to 2 tons per acre of soil.

References Cited in the file of this patent

UNITED STATES PATENTS

| | | |
|---|---|---|
| 1,045,723 | McFetridge | Nov. 26, 1912 |
| 1,384,990 | Campbell | July 19, 1921 |
| 1,428,633 | Hoffman | Sept. 12, 1922 |
| 2,103,953 | Northen | Dec. 28, 1937 |
| 2,129,334 | Northen | Sept. 6, 1938 |
| 2,317,990 | Grether | May 4, 1943 |
| 2,532,548 | Heide | Dec. 5, 1950 |

FOREIGN PATENTS

| | | |
|---|---|---|
| 423,886 | Italy | July 30, 1947 |
| 455,121 | Italy | Feb. 14, 1950 |
| 456,362 | Italy | Apr. 1, 1950 |

OTHER REFERENCES

Gasparini et al.: "Nuovi Studi e Realizzazioni Sulla Correzione dei Terreni Argillosi," pub. 1949, at Florence, Italy, in vol. 125 (or vol. 13 of series 6), pp. 113–130 of I Georgofili Atti della Accademia dei Georgofili, for Jan.–June 1949.